(12) United States Patent
Chandrasekhar et al.

(10) Patent No.: US 6,996,307 B2
(45) Date of Patent: Feb. 7, 2006

(54) VARIABLE-BANDWIDTH MULTI-GRANULARITY OPTICAL ADD/DROP NETWORK

(75) Inventors: Sethumadhavan Chandrasekhar, Matawan, NJ (US); Christopher Richard Doerr, Middletown, NJ (US); Yikai Su, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 154 days.

(21) Appl. No.: 10/657,979

(22) Filed: Sep. 9, 2003

(65) Prior Publication Data

US 2005/0053325 A1    Mar. 10, 2005

(51) Int. Cl.
G02B 6/28    (2006.01)
H04J 14/02    (2006.01)
(52) U.S. Cl. .......................................... 385/24; 398/83
(58) Field of Classification Search ................. 385/24; 398/83–85
See application file for complete search history.

(56) References Cited

U.S. PATENT DOCUMENTS

2003/0002104 A1 * 1/2003 Caroli et al. ................ 359/127

2004/0208548 A1 * 10/2004 Gruber et al. ............... 398/50
2004/0247239 A1 * 12/2004 Eldada ....................... 385/27

OTHER PUBLICATIONS

L. Noirie et al, "Multi-Granularity Optical Cross-Connect," in Proc ECOC 2000, paper 9.2.4.
M. Vasilyev et al, "'Broadcast and Select' OADM in 80×10.7 Gb/s Ultra-Longhaul Network," IEEE Photonics Tech. Letters, vol. 15, No. 2, pp 332-334, Feb. 2003.

* cited by examiner

*Primary Examiner*—John D. Lee
*Assistant Examiner*—Tina M Wong

(57) ABSTRACT

A variable bandwidth hierarchical OADM apparatus and method handles different data rates, based on a waveband OADM and one or more wavelength OADMs in parallel. The wavelength OADM combines multiple adjacent channels with fine granularity up to the bandwidth of the waveband OADM. The wavebands and wavelengths to be passed, dropped, and added by the hierarchical OADM apparatus are all electronically selectable, hence no hardware modification is needed when the data rate is changed. The use of a coarse granularity waveband OADM and variable-bandwidth wavelength OADM with fine granularity enables our hierarchical OADM apparatus and method to provide a variable-bandwidth multi-granularity add/drop capability.

12 Claims, 4 Drawing Sheets

VARIABLE-BANDWIDTH MULTI-GRANULARITY OPTICAL ADD/DROP NETWORK

TECHNICAL FIELD OF THE INVENTION

This invention relates generally to optical add/drop networks and, more particularly, to a method and apparatus for implementing a variable-bandwidth multi-granularity optical add/drop multiplex network.

BACKGROUND OF THE INVENTION

In the design and implementation of optical transparent networks, efficient utilization of bandwidth becomes challenging due to traffic demands with different end-to-end bandwidth requirements and data rates that are likely to change as the offered services change. In today's optical networks, however, since optical add-drop multiplexers (OADMs) are designed with fixed channel bandwidth, they do not provide for the efficient utilization of bandwidth. The fixed channel bandwidth OADM results in two potential problems: 1) low spectral efficiency for low-rate signals, and 2) when data rate is increased beyond the available channel bandwidth the OADM has to be replaced.

Prior techniques only support single data rate [1]–[5]. However, none of these prior techniques have addressed the data rate upgrade issue.

What is desired is a variable bandwidth OADM to satisfy customer requirements, reduce the cost of data rate upgrade, and to enable high-bandwidth efficiency at various data rates. The variable-bandwidth issue in a 2×2 wavelength-selective cross connect was addressed in Ref. [6].

SUMMARY OF THE INVENTION

In accordance with the present invention, we disclose a method and apparatus for implementing a variable bandwidth hierarchical OADM to handle different data rates. This is achieved by using an OADM apparatus including one or more variable-bandwidth wavelength OADMs connected in parallel to a waveband OADM. The wavelength OADM combines multiple adjacent channels with fine granularity to form a variable-bandwidth device that can more efficiently accommodate channel bandwidth increases/decreases for data rate upgrade/downgrades. Furthermore, to reduce the control elements associated with the fine granularity, the waveband OADM provides coarse granularity for bundled traffic sharing the same paths. The waveband and wavelength to be passed, dropped, and added by the hierarchical OADM apparatus are all electronically selectable, hence no hardware modification is needed when the data rate is changed. The use of a coarse granularity waveband OADM and fine granularity wavelength OADM enables our hierarchical OADM apparatus and method to provide a variable-bandwidth multi-granularity add/drop capability. The waveband OADM reduces the control complexity associated with the fine granularity wavelength OADM and provides coarse granularity for bundled traffic with the same paths. Our hierarchical OADM does not require a fiber switch fabric as needed in prior proposed multi-granularity cross connect with cascaded configuration.

More particularly, our hierarchical OADM apparatus comprises a coupler for receiving a multi-wavelength input optical signal at an input port of the OADM apparatus and coupling a first signal portion to a waveband OADM and a second signal portion to a variable-bandwidth wavelength OADM;

the waveband OADM for
  receiving the first signal portion at a first input port;
  selectively passing one or more wavebands of the multi-wavelength optical signal,
  outputting the non-passed wavelength bands at a drop port, and
  receiving a second input optical signal at an add port which is combined with the passed wavebands to form a first output signal;

the variable-bandwidth wavelength OADM, connected in parallel with the waveband OADM, for
  receiving the second signal portion at a second input port;
  providing variable bandwidth by selectively passing one or more wavelengths of a selected waveband of the multi-wavelength optical signal,
  outputting the non-passed wavelengths at a drop port, and
  receiving a third input optical signal at an add port which is combined with the passed wavelength channels of the multi-wavelength optical signal to form a second output signal; and a combiner for combining the first and second output signals to form an OADM apparatus output signal.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
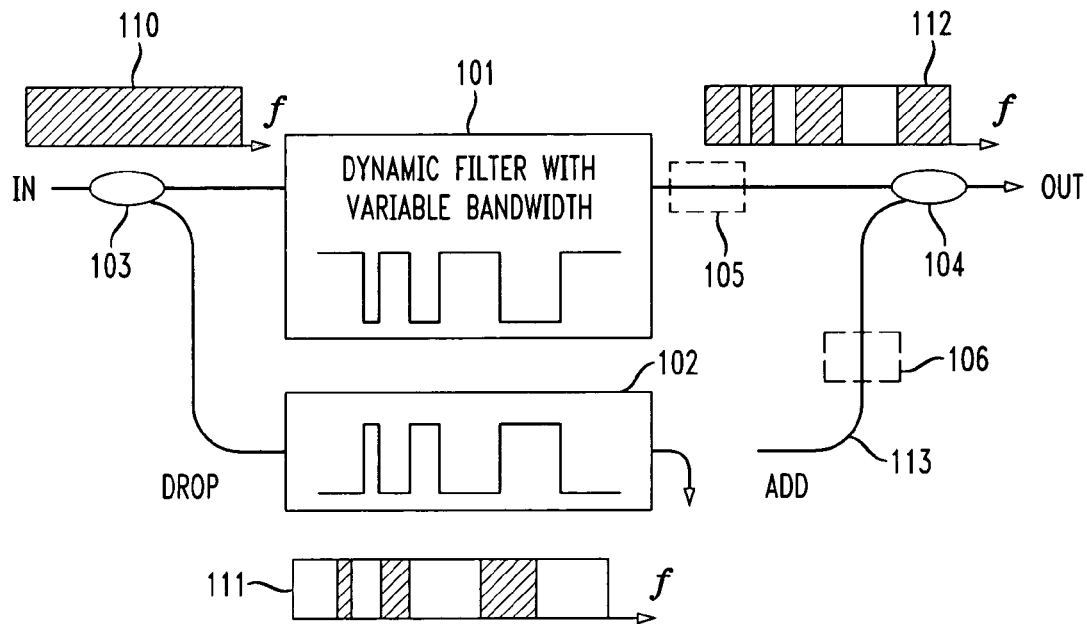
FIG. 1 illustrates a blocker type OADM with two filters operating in complementary mode.

With reference to FIG. 1, there is shown an illustrative diagram of a variable-bandwidth blocker-type optical add-drop multiplexer (OADM). The blocker type OADM includes two dynamic filters 101 and 102 that each has a controllable variable bandwidth and which operate in complementary modes. The input signal IN, shown as 110, is split by a 50% coupler 103, which couples signals to PASS dynamic filter 101 and a DROP dynamic filter 102. The signal outputted from the Drop filter 102, shown as 111, is complementary to the output signal, shown as 112, from the PASS filter 101. While the coupler 103 is described as a 50% coupler, it should be understood that a coupler that does not equally split the signal may be utilized. In such a situation, an attenuator 105 or 106 would be used to equalize the signal levels to be combined in add coupler 104. Note the drop filter 102 can also be in the form of a power splitter with tunable filters. The signal from PASS filter 101 is combined with the ADD signal 113 using the add coupler 104 to form the output signal OUT from the OADM. The ADD signal may include some or all of the dropped wavelengths shown in DROP signal 111.

To reduce the control complexity, bundling of wavelengths along the same optical path in a network and optical bypassing of through traffic is an effective approach to reducing node complexity, considering that most traffic (about 75%) is through traffic [1].

Figure 2:
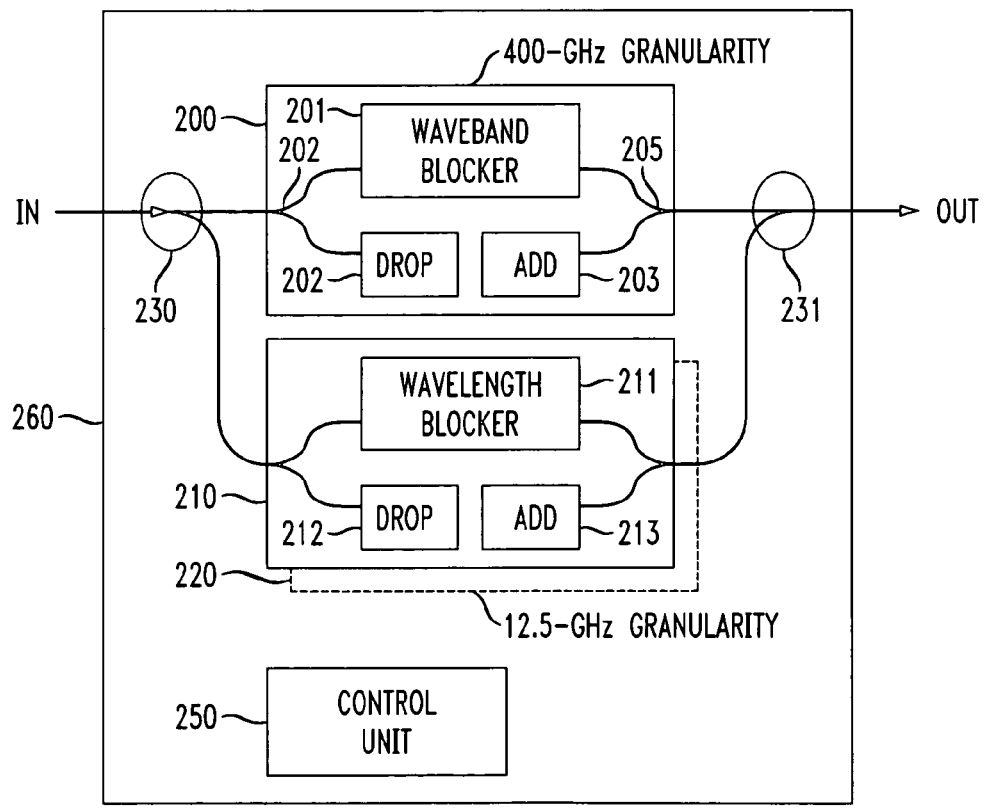
FIG. 2 illustrates, in accordance with the present invention, a block diagram of our hierarchical OADM including a waveband blocker-filter type OADM and one or more wavelength blocker-filter type OADMs that together provide a multi-granularity optical add/drop capability.

FIG. 2 illustrates, in accordance with the present invention, a block diagram of our hierarchical OADM node 260 architecture that has two OADM layers in parallel, which together provide a multi-granularity optical add/drop capability. The first layer includes a waveband blocker-filter type OADM 200 and the second layer includes one or more wavelength blocker-filter type OADMs 210, 220. If there are N wavelength OADMs 220, then the total splitting ratio is 2×(1+N), the extra coupler outputs connecting to the wavelength OADMs 220. Alternatively, instead of using a higher port-count coupler, one could use a band demultiplexer before the wavelength OADMs and a band multiplexer afterwards. The band demultiplexer/multiplexer would route each band to a different wavelength OADM. The wavelength OADM(s) 210, 220 each provides variable bandwidth with fine granularity, while the waveband OADM 200 provides coarse granularity to reduce control elements and simplifies network management. In another embodiment, the waveband OADM 200 may be operated as a variable-bandwidth OADM to provide greater variable-bandwidth capability to the OADM node 260. Incoming signals IN are power-split, in splitter 230, and fed into the waveband 200 and wavelength 210 OADMs, each operating in a broadcast and select manner based on blocker filters. As mentioned above, if the hierarchical OADM node 260 includes a second wavelength blocker-filter type OADM 220, then the splitter 230 must divide the input signal IN into three equal parts.

Figure 3:
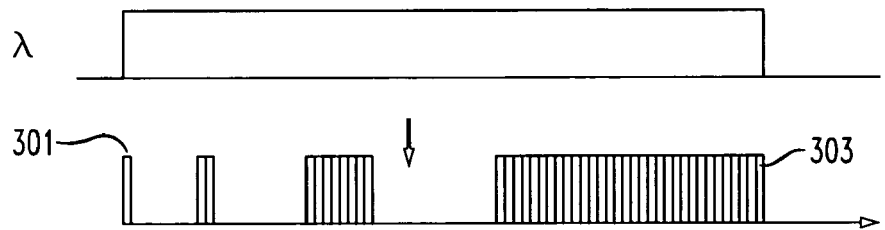
FIG. 3 illustrates the variable-bandwidth needed to handle different data rates.

With reference to FIG. 3, the wavelength OADM 210 provides adjustable bandwidths as fine as 12.5 GHz indicated as 301, and as coarse as 400 GHz indicated as 302, which is the total available bandwidth of the wavelength OADM 210. The waveband OADM is selected to have a 400-GHz bandwidth, equal to thirty two 12.5 GHZ wavelength channels. Note the fine and coarse bandwidth values used here are for illustration purpose, other variations can apply. Using this technique, an illustrative C band of 4 THz can be handled by a waveband OADM 200 having ten 400 GHz bands and a wavelength OADM 210 having thirty-two 12.5 GHz wavelength channels. This compares to an alternative possible technique of handling 4 THz using a wavelength OADM having 320 controllable 12.5 GHz wavelength elements, which increases control complexity. Plus, such a device is not available yet. Our hierarchical OADM node 260 architecture also supports the common data rates such as 10-Gb/s (using two 12.5 GHz channel), 40-Gb/s (using eight 12.5 GHz channels), and 160-Gb/s (using thirty two 12.5 GHz channels). The above assumes that the data rate in Gb/s utilizes only 40 percent of the channel width in GHz. Thus our adjustable-bandwidth hierarchical OADM node 260 architecture supports multiple data rates of 10 Gb/s, 40 Gb/s, and 160 Gb/s, with the same spectral efficiency. While the present invention has been described with respect to using the standard channel size and separation, it should be noted that our hierarchical OADM node 260 architecture could be equally applied to other channel sizes and separations.

As previously noted, prior techniques utilized multi-stage switching at the wavelength and waveband levels to reduce the number of connection ports [1]–[5]. By using our hierarchical OADM 260 node architecture that has waveband and wavelength OADM layers in parallel and using blocker-type devices to provide a multi-granularity optical add/drop capability, we have eliminated the need for a switch fabric.

Returning to FIG. 2, once bundled traffic streams fill a waveband, they are then passed through the waveband OADM 200. The coarse granularity in the waveband OADM 200 helps to reduce the number of connection and control ports, and therefore the node complexity that is seen in the wavelength OADM 210, while the wavelength OADM 210 provides flexible bandwidths with fine granularity. Unlike the prior N×N wavelength selective type switch fabric as used in multi-granularity optical cross connect, our parallel architecture hierarchical OADM node 260 is based on blocker type filters for the wavelength and waveband OADMs. Therefore no switch fabric is needed at the waveband/wavelength level. In addition, our parallel structure also reduces the signal degradation since there is no cascading of filters. As will be discussed, there could be one or more wavelength OADMs 210, 220 attached with a waveband OADM 200, depending on the traffic pattern. A controller unit 250 coordinates the operation of waveband OADM 200 and wavelength OADMs 210, 220, i.e., to insure that if a given wavelength is to be dropped through a wavelength OADM 210, the corresponding waveband in the waveband OADM 200 should be blocked. Note in the following description the term "blocked" is used to refer to wavelengths or wavebands that are "not passed" by an OADM.

Figure 4A:
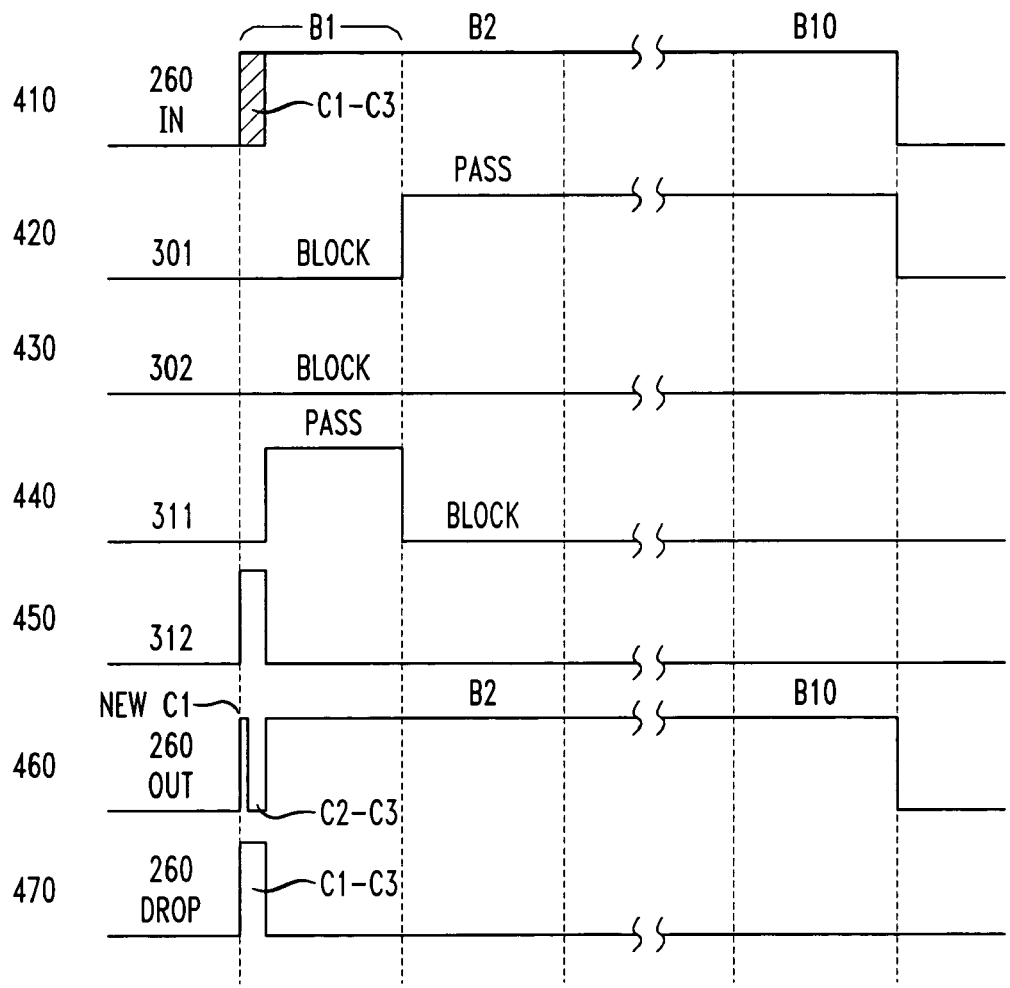
FIG. 4A illustratively shows the pass and drop signals of a waveband OADM and a wavelength OADM when the drop signal has a bandwidth that is less than a waveband OADM bandwidth.
Figure 4B:
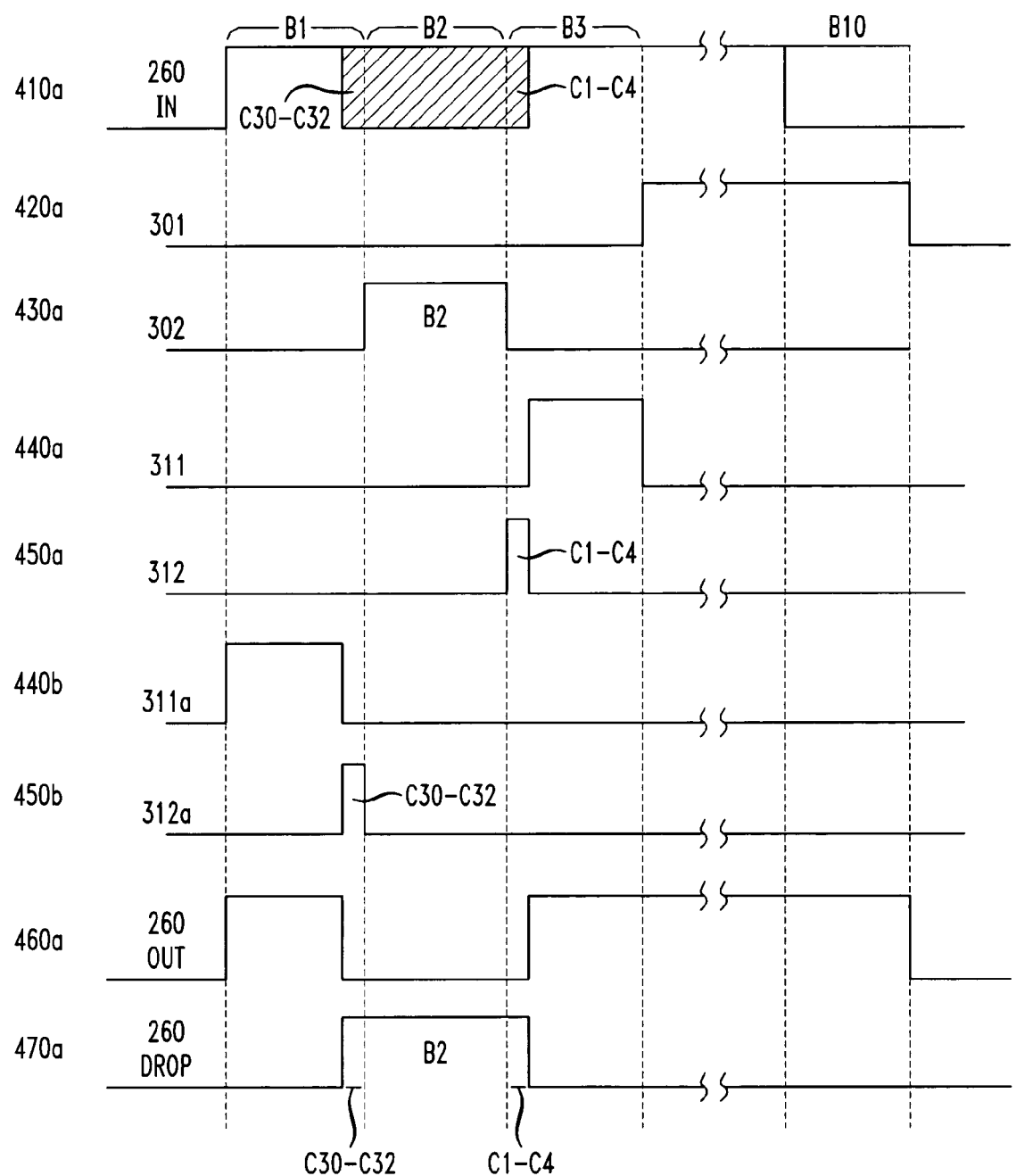
FIG. 4B illustratively shows the pass and drop signals of the waveband OADM and wavelength OADM when the drop signal has a bandwidth that is more than a waveband OADM bandwidth.

With reference to FIGS. 4A and 4B we describe illustrative operational examples of OADM node 260 and how controller 250 coordinates the operations of waveband OADM 200 and wavelength OADMs 210, 220. With joint reference to FIGS. 2 and 4A, we first assume that OADM node 260 receives a WDM signal, IN, over an optical facility. The WDM signal, shown as waveform 410, includes all channels C1–C32 in all Bands B1–B10 and we assume that OADM node 260 is to drop three 12.5 GHz wavelength channels C1–C3 of band B1. This example illustrates the fine granularity feature of our OADM node 260. We also assume that one new channel C1 is to be added by add unit 213. The channel drop and add information is received by controller 250 of OADM 260 in the standard manner, from control information embedded in the WDM signal or received over a separate signaling facility. While controller 250 is shown as part of OADM node 260, it could also be part of a separate control unit that may control other OADM nodes. Since waveband OADM 200 and wavelength OADM unit 210 are electronically controllable by controller 250 (as will be described in later paragraphs), real-time control can be exercised in response to real time network control information.

As shown by waveform 420, in response to the drop channels C1–C3 of band B1 control information, controller 250 signals waveband blocker 201 of OADM 200 to block band B1 and to pass bands B2–B10. As shown by waveform 430, controller 250 also signals drop unit 202 of OADM 200 to block bands B1–B10. Controller 250 also signals wavelength blocker 211 of OADM 210 to block channels C1–C3 and to pass channels C4–C32, as shown by waveform 440. Controller 250 also signals drop unit 212 to pass (i.e., drop) channels C1–C3 at the drop port and to block channels C4–C32, as shown by waveform 450. The resulting OUT signal at the output port of OADM node 260, which combines the signals from waveband blocker 201, wavelength blocker 211, and from add unit 213, is shown by waveform 460. As waveform 460 shows for OADM node 260, the OUT signal includes the ADD signal C1 (from add unit 203) and C4–C32 of band B1 (from wavelength blocker 211) and bands B2–B10 (from waveband blocker 201) and no signal from add unit 203. As waveform 470 shows, for OADM node 260, the DROP signal includes only channels C1–C3 of band B1, since no bands were dropped by waveband OADM 200. Note that for OADM node 260, if we ignore the ADD signal channel C1, the OUT signal 460 is complementary to the DROP signal 470 as required.

It should be noted that the waveband OADM 210 enables any one or more channels, either contiguous or separated channels within one band to be dropped. If one or more channels, either contiguous or separated channels within another band were to be to be dropped another wavelength OADM unit 220 would be used. The number of different wavebands, B1–B10, that have one or more channels to be dropped will determine the number of wavelength OADMs (210, 220, etc.) needed (one wavelength OADM for each separate band having one or more wavelength channels to be dropped). As noted previously, to reduce the control complexity and the number of wavelength OADMs needed, bundling of wavelengths along the same optical path in a network and optical bypassing of through traffic should be utilized.

With joint reference to FIGS. 2 and 4B, for this example we again assume that OADM node 260 receives a WDM signal, IN, shown as waveform 410a, includes all channels C1–C32 in all Bands B1–B10. In this example we illustrate and discuss the coarse waveband and fine wavelength granularity feature of the invention. We assume that OADM node 260 is to drop channels C30–C32 in band B1, all of band B2, and channels C1–C4 of band B3 are to be dropped. In this example, controller 250 sends control signals to enable the wavelength OADMs 210 and 220 to be associated, with bands B1 and B3, respectively.

Again, the channel drop and add information is received by controller 250 of OADM 260 in the standard manner. As shown by waveform 420a, in response to the drop channel control information, controller 250 signals waveband blocker 201 of OADM 200 to block bands B1–B3 and to pass bands B4–B10. As shown by waveform 430a, controller 250 also signals drop unit 202 of OADM 200 to pass (drop) band B2 and to block bands B1, B3–B10. As shown by waveform 440a, controller 250 signals wavelength blocker 211 of OADM 210 to block channels C1–C4 and pass channels C5–C32 of band B3. As shown by waveform 450a, controller 250 also signals drop unit 212 to drop (pass) channels C1–C4 to the drop port and to block channels C5–C32 of band B3. As shown by waveform 440b, controller 250 also signals the wavelength blocker (not shown) of OADM 220 to pass channels C1–C29 and block channels C29–C32 of band B1. As shown by waveform 450b, controller 250 also signals the drop unit (not shown) of OADM 220 to drop (pass) channels C30–C32 and block channels C1–C29.

Shown by waveform 460a is the resulting signal at the output OUT port of OADM node 260, which is a combination of the signals from waveband OADM 200 (blocker 201), wavelength OADM 210 (blocker 211), and wavelength OADM 220 (blocker and add unit not shown). As shown, waveform 460a includes existing bands B4–B10 (from the waveband blocker 201 of OADM 200), and C1–C29 of band B1 (from the wavelength blocker 211 in the wavelength OADM210), and existing channels C5–C32 (from the wavelength blocker of OADM 220). As shown by waveform 470a, the dropped channels include C30–C32 of band B1, the dropped band B2, and the dropped channels C1–C4 of band B3. Again, note that for OADM node 260 the OUT signal 460 is complementary to the DROP signal 470 as required.

Figure 5:
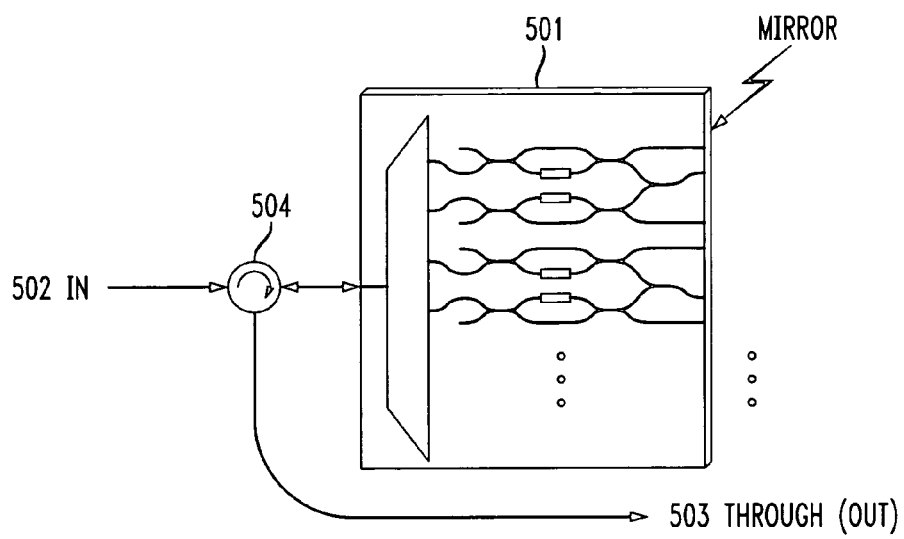
FIG. 5 shows an illustrative implementation of a waveband OADM.

With reference to FIG. 5, we describe the implementation of an illustrative waveband OADM 200. This is described in U.S. Pat. No. 6,266,460, "Large-channel-count programmable wavelength add-drop" by C. R. Doerr. Both the waveband blocker 201 and drop unit 202 are each implemented using a planar waveguide add-drop filter having 400 GHz granularity. In the waveband blocker 201 only the input port 502 and output (through) port 503 of the device 501 are used so it behaves as a blocker filter. It covers 32 nm, which in our application is divided to 10 wavebands B1–B10, each having 400-GHz bandwidth. Switches 504 are used to dynamically control the selected bands from the input port 502 that are to be passed through to the output port 503 via circulator 504. The illustrative drop unit 202 utilizes the input port 502 and the drop ports 503 of the planar waveguide add-drop filter. The add unit 203 typically includes a WDM multiplexer for each band to be added. While the drop unit 202 was described as using a wavelength demultiplexer, it should be noted that power splitter with one or more filters may also be utilized. The latter approach may be desirable when only one or a few wavelengths are to be dropped. Additionally, the add unit 203 may also be implemented using a simple power combiner.

The planar waveguide add-drop filter used in both the waveband blocker 201 and drop unit 202 may be implemented as described in the article entitled "40-Wavelength Add-Drop Filter" by C. R. Doerr et al, IEEE Photonics Tech. Letters, Vol. 11, No. 11, November 1999, pages 1437–1439, which is incorporated by reference herein.

Figure 6:
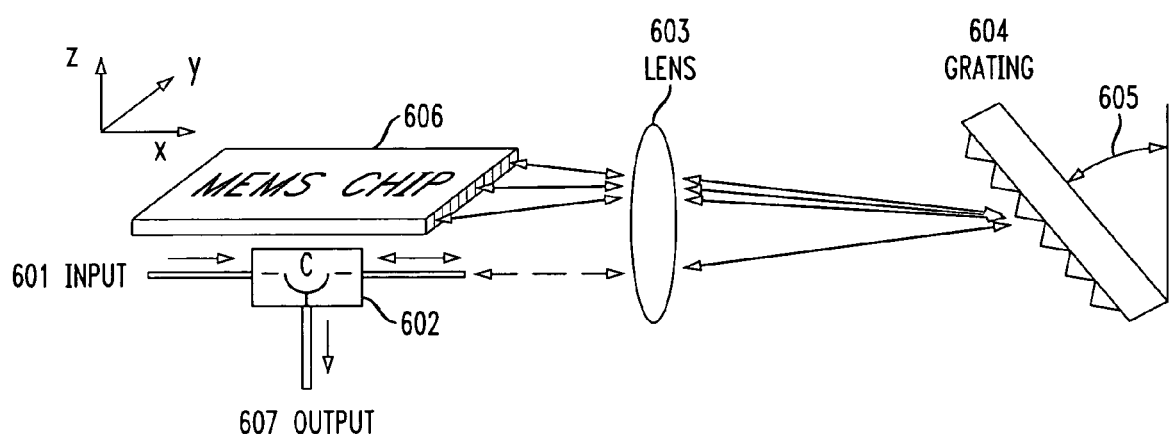
FIG. 6 shows an illustrative implementation of a wavelength OADM.

With reference to FIG. 6, we describe the implementation of an illustrative wavelength OADM, e.g., 210. Both the wavelength blocker 211 and drop unit 212 are implemented using a blocker type filter that supports different bandwidths in add-drop. In our embodiment, a micro electromechanical switch (MEMS) based blocker filter with 32 continuous channels, and the channel spacing designed to be 12.5 GHz is used. The MEMS based blocker filter may be implemented as described in the article entitled "High-dynamic Range Channelized MEMS Equalizing Filter" by D. T. Neilson et al, OFC 2002, page 586–588, which is incorporated by reference herein.

The grating 605 is used to select the waveband B1–B10 at which the input wavelength blocker 211 is to be used. A control signal from controller 250 selects the angle 605 and hence the selected waveband. Only the input WDM signal of the selected waveband will be reflected to lens 603. The input WDM signals are received at input port 601, passes through circulator 602 and lens 603 directs the signal to grating 605. The grating 605 demultiplexes the WDM signal into its components wavelength channels (32 in our example) and directs these back through lens 603 to MEMS chip 606. The MEMS chip 606 is also responsive to a control signal from controller 250 to select channels that are to be blocked. MEMS 606 does not reflect the blocked channels. The channels to be passed are reflected back by MEMS 606 through lens 603, grating 605, lens 603, and circulator 602 to output port 607. The drop unit 212 operates in a similar manner, except that the dropped channels are reflected back by MEMS chip 606 to the port 607, which serves as a drop port. Again the MEMS chip 606 of drop unit 212 is responsive to a control signal from controller 250 to select channels that are to be dropped.

While our example of the wavelength blocker 211 and drop unit 212 of wavelength OADM 210 uses 32 channels, any arbitrary number of neighboring channels can be combined to form a new, wider wavelength channel to support higher data rates. The total bandwidth of the wavelength OADM is 400 GHz to fill a waveband. Thus under control of controller 250, data-rate upgrade can be realized electronically without hardware modification in the OADM node 260. The controller 250 controls the selection of the waveband handled by waveband OADM 200 and wavelength OADM 210 and controls the selection of the wavelengths by wavelength OADM 210 (and any additional wavelength OADMs, e.g., 220 utilized).

The wavelength blocker has a free-spectral range smaller than the full span covered by the waveband device. In such a case, one could use the band demultiplexer/multiplexer architecture to improve out-of-band suppression ratio described earlier.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

REFERENCES

[1]. M. Vasilyev et al., "Broadcast and select OADM in 80×10.7 Gb/s ultra-longhaul network," *IEEE Photonics Technology Letters*, vol. 15, no. 2, pp 332–334.
[2]. U.S. Pat. No. 6,348,984, "Optical add/drop multiplexer," Feb. 19, 2002
[3]. L. Noirei et al., "Multi-granularity optical cross-connect," in *Proc. ECOC* 2000, paper 9.2.4.
[4]. U.S. Pat. No. 6,429,974, "Add/drop multiplexer," Aug. 6, 2002
[5]. U.S. Pat. No. 6,243,179, "Banded add drop device," Jun. 5, 2001
[6]. C. R. Doerr et al., "2×2 wavelength-selective cross connect capable of switching 128 channels in sets of eight," IEEE Photonics Technology Letters, March, 2002, pp 387–389

We claim:

1. A hierarchical optical add-drop multiplexer, OADM, apparatus comprising
 a power-splitter for receiving a multi-wavelength input optical signal and splitting it into a first signal portion to a waveband OADM and a second signal portion to a variable-bandwidth wavelength OADM;
 the waveband OADM with a coarse granularity for
  receiving the first signal portion at a first input port,
  selectively passing one or more wavebands of the received first signal portion, where each waveband includes a group of wavelengths,
  outputting the non-passed one or more wavebands of the received first signal portion at a drop port, and
  receiving a second input optical signal at an add port which is combined with passed wavebands to form a first output signal;
 the variable-bandwidth wavelength OADM with a fine granularity, connected in parallel with the waveband OADM, for
  receiving the second signal portion at a second input port;
  providing variable bandwidth by selectively passing one or more wavelengths of a selected one of the one or more non-passed wavebands of the waveband OADM,
  outputting the non-passed one or more wavelengths at a drop port, and
  receiving a third input optical signal at an add port which is combined with passed one or more wavelength channels of the multi-wavelength optical signal to form a second output signal; and
 a combiner for combining the first and second output signals to form an OADM apparatus output signal.

2. The OADM apparatus of claim 1 wherein the first and second signal portions are equal.

3. The OADM apparatus of claim 1 wherein the waveband OADM is a variable-bandwidth apparatus and the one or more wavebands to be blocked by the waveband OADM is selected in response to a waveband control signal.

4. The OADM apparatus of claim 1 wherein a second waveband control signal is used to select the waveband where the wavelength OADM is to be utilized and the one or more passed wavelengths of that selected waveband are selected in response to a wavelength control signal.

5. The OADM apparatus of claim 1 wherein the waveband OADM includes a first waveband blocker, connected to receive the first equal portion signal, for selectively blocking one or more wavebands and passing non-blocked waveband through the OADM apparatus.

6. The OADM apparatus of claim 5 wherein the waveband OADM includes a second waveband blocker or a power slitter combined with band filters, connected to receive the first equal portion signal, for selectively dropping one or more wavebands.

7. The OADM, apparatus of claim 1 wherein the wavelength OADM includes a first wavelength blocker, unit connected to receive the second equal portion signal, for selectively passing one or more wavelength channels through the OADM apparatus.

8. The OADM, apparatus of claim 7 wherein the wavelength OADM includes a second wavelength blocker, or a power splitter combined with wavelength filters, unit connected to receive the second equal portion signal, for dropping the selected one or more wavelengths.

9. The OADM apparatus of claim 1 further including a second wavelength OADM, a second splitter that power splits the optical signal sent to the wavelength OADM and sends it to both the wavelength OADM and the second wavelength OADM, and a combiner that power combines the signals from both the wavelength OADM and the second wavelength OADM to form the second output signal, and wherein a third waveband control signal is used to select a second waveband where the second wavelength OADM is to be utilized and wherein one or more blocked wavelengths of that selected second waveband are selected in response to a second wavelength control signal.

10. The OADM apparatus of claim 1 further including a second wavelength OADM, wherein the coupler is a band demultiplexer that splits the input optical signal and sends it to the waveband OADM, the wavelength OADM, and the second wavelength OADM, and wherein the combiner is a band multiplexer that combines the signals from the waveband OADM, the wavelength OADM, and the second wavelength OADM to form the OADM apparatus output signal.

11. The OADM apparatus of claim 1 wherein the coupler is a band demultiplexer that splits the input optical signal and sends it to the waveband OADM and the wavelength OADM and wherein the combiner is a band multiplexer that combines the signals from the waveband OADM and the wavelength OADM to form the OADM apparatus output signal.

12. A method of operating an optical add-drop multiplexer, OADM, apparatus comprising the steps of:

receiving a multi-wavelength input optical signal and power-splitting it into a first signal portion that is coupled to a coarse granularity waveband OADM and a second signal portion to a variable-bandwidth fine granularity wavelength OADM;

the waveband OADM performing the steps of receiving the first signal portion, selectively passing one or more wavebands of the received first signal portion, where each waveband includes a group of wavelengths, outputting non-passed one or more wavebands of the received first signal portion at a drop port, and receiving a second input optical signal at an add port which is combined with passed one or more wavebands to form a first output signal;

the variable-bandwidth wavelength OADM, connected in parallel with the waveband OADM, for receiving the second signal portion at a second input port;

providing variable bandwidth by selectively passing one or more wavelengths of a selected one of the one or more non-passed wavebands of the waveband OADM, outputting the non-passed one or more wavelengths at a drop port, and receiving a third input optical signal at an add port which is combined with the passed one or more wavelength channels of the multi-wavelength optical signal to form a second output signal; and combining the first and second output signals to form an OADM apparatus output signal.

* * * * *